United States Patent
Bhagwat et al.

[19]

[11] Patent Number: 5,941,988
[45] Date of Patent: Aug. 24, 1999

[54] SESSION AND TRANSPORT LAYER PROXIES VIA TCP GLUE

[75] Inventors: Pravin Bhagwat, White Plains, N.Y.; David Aaron Maltz, Pittsburgh, Pa.

[73] Assignee: International Business Machines Corporation, Armonk, N.Y.

[21] Appl. No.: 08/789,447

[22] Filed: Jan. 27, 1997

[51] Int. Cl.$^6$ .................................................. G06F 13/00
[52] U.S. Cl. ................................................................ 713/201
[58] Field of Search ......................... 395/187.01, 188.01, 395/186; 370/474, 230, 503; 713/201, 202, 200

[56] References Cited

U.S. PATENT DOCUMENTS

| | | | |
|---|---|---|---|
| 5,021,949 | 6/1991 | Morten et al. | 364/200 |
| 5,249,292 | 9/1993 | Chiappa | 395/650 |
| 5,550,816 | 8/1996 | Hardwick et al. | 370/60 |
| 5,566,170 | 10/1996 | Bakke et al. | 370/60 |
| 5,668,809 | 9/1997 | Rostoker et al. | 370/392 |
| 5,692,124 | 11/1997 | Holden et al. | 395/187.01 |
| 5,781,715 | 7/1998 | Sheu | 395/182.02 |
| 5,802,287 | 9/1998 | Rostoker et al. | 395/200.8 |
| 5,848,227 | 10/1998 | Sheu | 395/182.02 |
| 5,852,721 | 12/1998 | Dillon et al. | 395/200.47 |

OTHER PUBLICATIONS

Bellovin et al., "Network Firewalls", IEEE, pp. 1–8, Sep. 1994.

Chinitz et al., "Snare Works: A Transparent Security Framework for TCP/IP and Legacy Application", An Intellisoft White Paper, pp. 1–14, Aug. 1996.

Parker, "Teach Yourself TCP/IP in 14 Days", SAMS Publishing, pp. 89–111, Apr. 1996.

Siyan et al., "Internet Firewalls and Network Security", New Riders Publishing, pp. 154–173, 273–302, and 306–316, Jan. 1995.

David Koblas and Michelle R. Koblas, "SOCKS", UNIX Security Symposium, USENIX Association (199_), pp. 77–83.

Ying–Da Lee, "SOCKS: A protocol for TCP proxy across firewalls", http://www.socks.nec.com/socks4.protocol.

M. Leech, M. Ganis, Y. Lee, R. Kuris, D. Koblas, and L. Jones, "SOCKS Protocol Version 5", ftp://ds.internic.net/rfc/rfc1928.txt.

*Primary Examiner*—Robert W. Beausoliel, Jr.
*Assistant Examiner*—Stephen C. Elmore
*Attorney, Agent, or Firm*—Whitham, Curtis & Whitham; Douglas W. Cameron

[57] ABSTRACT

A method of merging two separate TCP connections terminating at a common host and "gluing" them into a single connection between two end systems, where the single connection preserves TCP end-to-end semantics. The technique retains the session setup functions of the transport layer proxy, but provides a method to push the data copying into kernel space to improve the relay operation. More specifically, a byte stream arriving on one end of the split connection is mapped directly into the sequence number space of the other split connection. This process of mapping, or TCP gluing, involves updating a subset of TCP and IP header fields; that is, source and destination addresses, port numbers, sequence numbers and checksum. The changes to the TCP/IP packet headers are on-the-fly as packets are relayed over the glued connection between the original separate TCP connections.

38 Claims, 7 Drawing Sheets

SESSION AND TRANSPORT LAYER PROXIES VIA TCP GLUE

BACKGROUND OF THE INVENTION

1. Field of the Invention

The present invention generally relates to packet switched network communications and, more particularly, a method for improving the performance efficiency of session layer proxies such as network firewalls and caching proxies for transmissions via communications networks, such as the Internet.

2. Background Description

The Internet is a collection of networks throughout the world which facilitates the sharing of resources among participating organizations, including government agencies, educational institutions and private corporations. These networks use the Transmission Control Protocol/Internet Protocol (TCP/IP) protocol suite and share a common address space. Thus, computers on the Internet use compatible communications standards and share the ability to contact each other and exchange data. Users of the Internet communicate mainly via electronic mail (e-mail), via http, the protocol for accessing the world wide web, via Telnet, a process that allows users to log in to a remote host, and via implementations of the File Transfer Protocol (FTP), a protocol that allows them to transfer information on a remote host to their local site.

Security is a major concern when connecting a network, such as a local area network (LAN) to the Internet. One of the more important concerns is intruders attempting to gain access to local hosts. A common method for preventing these types of intrusions is to install a so-called "firewall" which is a secure single point of attachment to the Internet. This single point of attachment takes the form of a firewall host which does not allow any traffic to pass through but allows both incoming and outgoing connections. In a typical firewall host implementation, a user wanting to transfer a file on a host in the LAN to an external host via the Internet first transfers the file to the firewall host and then logs into the firewall and transfer the file to the external host. While this procedure provides a high level of security for a single user, maintaining security as the number of users requiring access to this host becomes difficult. For general information on firewalls, see William R. Cheswick and Steven M. Bellovin, *Firewalls and Internet Security*, Addison-Wesley (1994).

A transport layer proxy architecture, called SOCKS, was created in an attempt to minimize security problems while allowing access by a large number of users. See, for example, David Koblas and Michelle R. Koblas, "SOCKS", *UNIX Security Symposium*, USENIX Association (199_), pp. 77–83, Ying-Da Lee, "SOCKS: A protocol for TCP proxy across firewalls", http://www.socks.nec.com/socks4.protocol, and M. Leech, M. Ganis, Y. Lee, R. Kuris, D. Koblas, and L. Jones, "SOCKS Protocol Version 5", ftp://ds.internic.net/rfc/rfc1928.txt. In a transport layer proxy architecture, one end system, which is called the client, initiates a session by making a connection to the proxy. The client and proxy use the connection to exchange messages negotiating session setup information such as authentication or proxy request (e.g., the foreign host to connect to a firewall proxy or the URL (Uniform Resource Locator) to fetch for an HTTP (Hypertext Transfer Protocol) proxy). The proxy then carries out the request, commonly opening a connection to another end-system outside the firewall, which is called the server, as directed by the client. The proxy may exchange session set information with the server over the connection. After session set up has been completed on both connections, the proxy begins to copy data back and forth between the two connections and does not delete from, add to, or alter the information flowing between the hosts (although it may silently keep a copy of the information, as in the case of HTTP caching proxies).

The currently used techniques of constructing a TCP proxy (e.g., a SOCKS server) involves splitting a TCP connection into two halves (client-to-proxy and proxy-to-server) and then using an application layer server to exchange data between the two ends. All known current transport layer proxies perform the data copying function in user space; i.e., a user process waits in a tight loop reading data from one socket and writing it to another one. Compared to the client or the server, the proxy spends twice as many CPU cycles on protocol processing, data copying, and context switching. What is needed is a way to effectively push data movement operation into kernel space to make the relay operation more efficient.

SUMMARY OF THE INVENTION

It is therefore an object of the present invention to provide a method which improves the performance of session layer proxies such as network firewalls and caching proxies.

According to the invention, a technique, called TCP gluing, retains the session set up functions of a transport layer proxy, but provides a method to push the data copying into kernel space. The byte stream arriving on one end of the split connection is mapped directly into the sequence number space of the other split connection. The mapping function, and the associated set of gluing operations are designed such that this operation is completely transparent to the client and the server. From an end-system's view, no data is either lost or duplicated.

The process of gluing only involves modifying a subset of TCP and IP header fields. Changes are made to TCP/IP packet headers on-the-fly as packets are relayed over the glued connection. This is a relatively light-weight operation, since the proxy spends only a few extra cycles in addition to the standard IP header processing. No state maintenance or application layer processing is needed.

The technique according to the invention improves the current state of the art in four ways:

C Efficient: Proxy acts like a layer 3.5 router. It does not incur either transport or application layer protocol processing overhead.

C Less bookkeeping: A TCP glue proxy need not maintain full TCP state for each end of the split connection. Moreover, since acknowledgements (ACKs) are end-to-end, the proxy is not required to buffer any packets.

C Better end-to-end (E2E) semantics: TCP glue enables two ends of the connection to communicate as peers, allowing control information such as acknowledgements, round trip time (RTT) estimates, window size, receive buffer size, etc., to flow end-to-end. Aside from other advantages, this also provides better reliability and congestion control.

C Better out-of-band semantics: Current proxy solutions place significant limitations one the use of out-of-band data. For example, SOCKS only supports the delivery of out-of-band (OOB) data in line. These limitations can result in common applications, such as Telnet and FTP, requiring modification to work through the proxy. Since a TCP glued connection between end hosts provides true TCP end-to-end semantics, the end systems can use OOB data in whatever way they chose and will see the same semantics non-proxied connections do.

Like other transport layer proxies, which use user libraries to intercept and route data through the proxy, proxies built with TCP glue can also be built so that changes are invisible to clients and servers, no changes are made to client or server protocol stack, and only the proxy is modified.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Overview

The preferred embodiment of the invention is described in terms of the TCP/IP protocol, but it will be understood by those skilled in the art that the concept of taking two already established transport layer sessions and transforming them into a single end-to-end connection by suitably modifying packet headers can be applied to all packet based communication network protocols, including, in addition to TCP/IP, OSI, XNS, Novell, Netbios, IPX, etc. In the following description, a specific example of this technique is applied to the TCP/IP protocol suite.

According to the preferred embodiment of the invention, as each segment of TCP data arrives from an end system at one socket of a glued connection, it is immediately processed and sent out the other socket of the glued connection to the other end system. The complete solution according to the invention is comprised of four parts:

1. Enabling synchronization between the end systems and the proxy.
2. Choosing a mapping function.
3. Making necessary changes in packet headers.
4. Tearing down completed connections.

Before describing each part, some background on TCP is required. TCP glue is an operation performed on two normal TCP connections. Before the glue operation is performed, the connections are independent. After the glue operation completes, the connections will be spliced together, and the proxy cannot read or write either connection.

Figure 1:
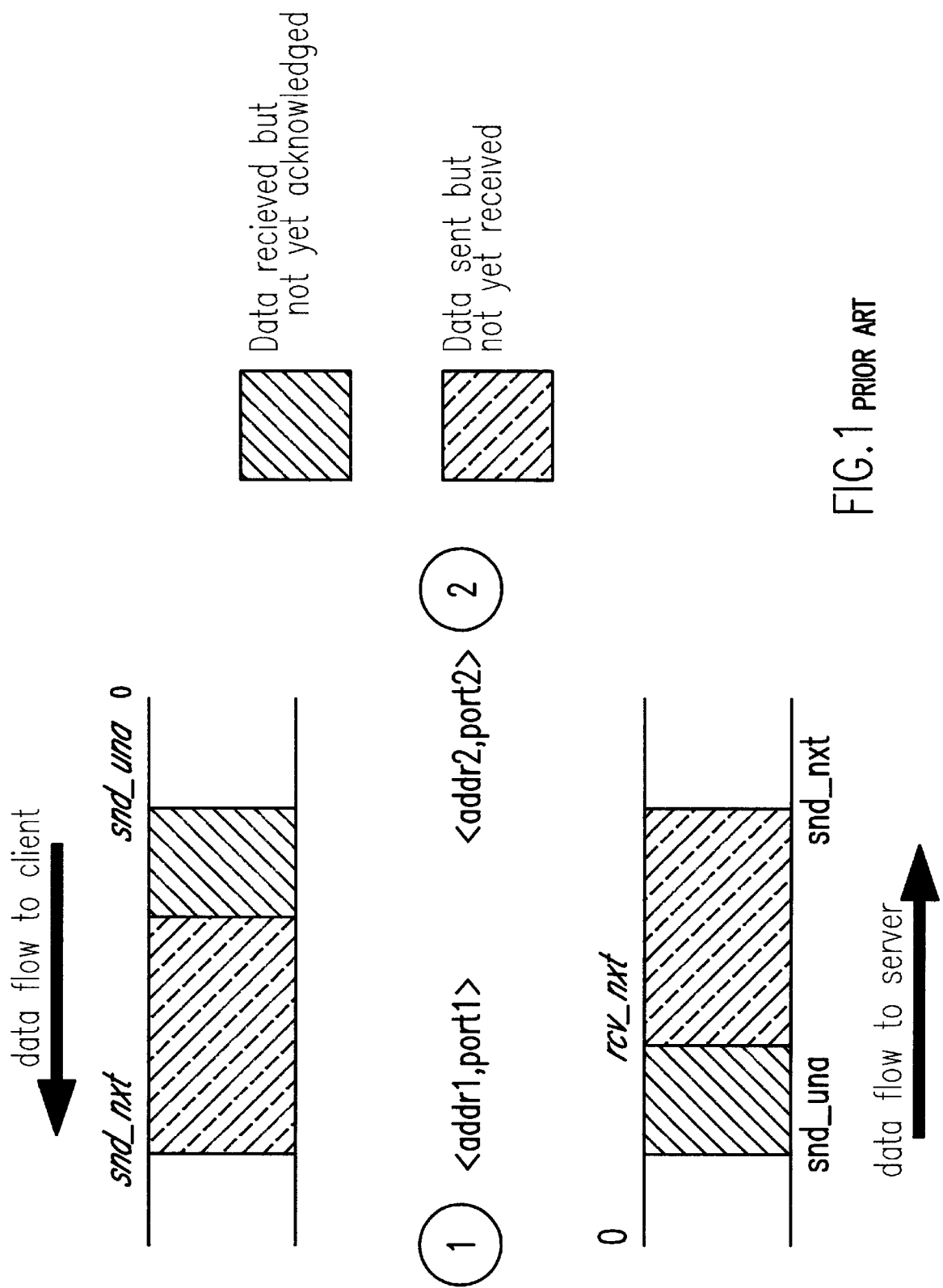
FIG. 1 is a data flow diagram showing a normal TCP connection with state counters labeled.

Referring now to the drawings, and more particularly to FIG. 1, there is represented a normal TCP connection. Each normal TCP connection is point-to-point and terminates at a TCP socket which is named by an address and a port number. A TCP connection is uniquely identified by the names of the two sockets at its endpoints. The two sockets shown in FIG. 1 are denoted by $\hat{I}$, named by <addr1,port1>, and $\ddot{I}$, named by <addr2,port2>. For each TCP socket, the normal TCP state machine maintains the following three counters which TCP uses to label all the data sent over the connection so it can recover from data loss or duplication:

snd_nxt The sequence number of the next data byte to be sent.

snd_una The sequence number of the first unacknowledged data byte (equivalent to the sequence number of the greatest ACK received).

rcv_nxt The sequence number of the next byte of data the socket expects to receive (equivalent to one more than the greatest sequence number received so far).

These counters define a sequence space associated with the socket. Counters labeled above the sequence spaces in slanted font are kept by socket $\ddot{I}$. Counters labeled in serif bold below the sequence spaces are kept by socket $\hat{I}$ Without loss of generality, it is assumed for this description that each sequence space begins numbering at zero.

TCP connections also have state in the form of TCP options negotiated at connection setup time. In the preferred embodiment of the invention, the TCP glue does not ensure that the same options are negotiated on both the proxy-client and proxy-server connections, so it is possible these connections will be negotiated with different TCP options. This could create problems once the two connections are glued together, since an end system may receive TCP options that it does not expect or have options it expects to be processed by the other end system. If options mismatch does create a problem, the preferred embodiment of the invention could be modified with the addition of a new kernel call to the proxy networking stack to negotiate the same set of options when connecting a new socket as were negotiated on an existing socket.

Enabling Synchronization

The TCP glue mechanism must provide methods for synchronizing the creation of the glue with the data transmissions of each end system. Since session set up happens in the application space while the glue set up occurs in the kernel, a synchronization mechanism is needed to notify applications when it is safe to start data transmission on a socket.

If an end system transmits data intended for the other end system before the proxy sets up the TCP glue, that data will end up in the proxy's socket buffers where the proxy could read them, but they will not be forwarded on to the other end system. This is referred to as client or server surge as the end system is "surging ahead" of the proxy in sending data. TCP glue provides two different synchronization mechanisms; one to cope with client surge and one to cope with server surge. The proxy designer must choose to invoke the correct combination of synchronization primitives to synchronize sessions of the type he or she is interested in proxying. It is assumed that clients can be modified; therefore, clients are synchronized by sending an explicit OK message. Servers, on the other hand, cannot be modified. So, the technique for server surge involves tricking the server into holding its data at the server until the glue is completely set up.

Client Surge

Figure 2:
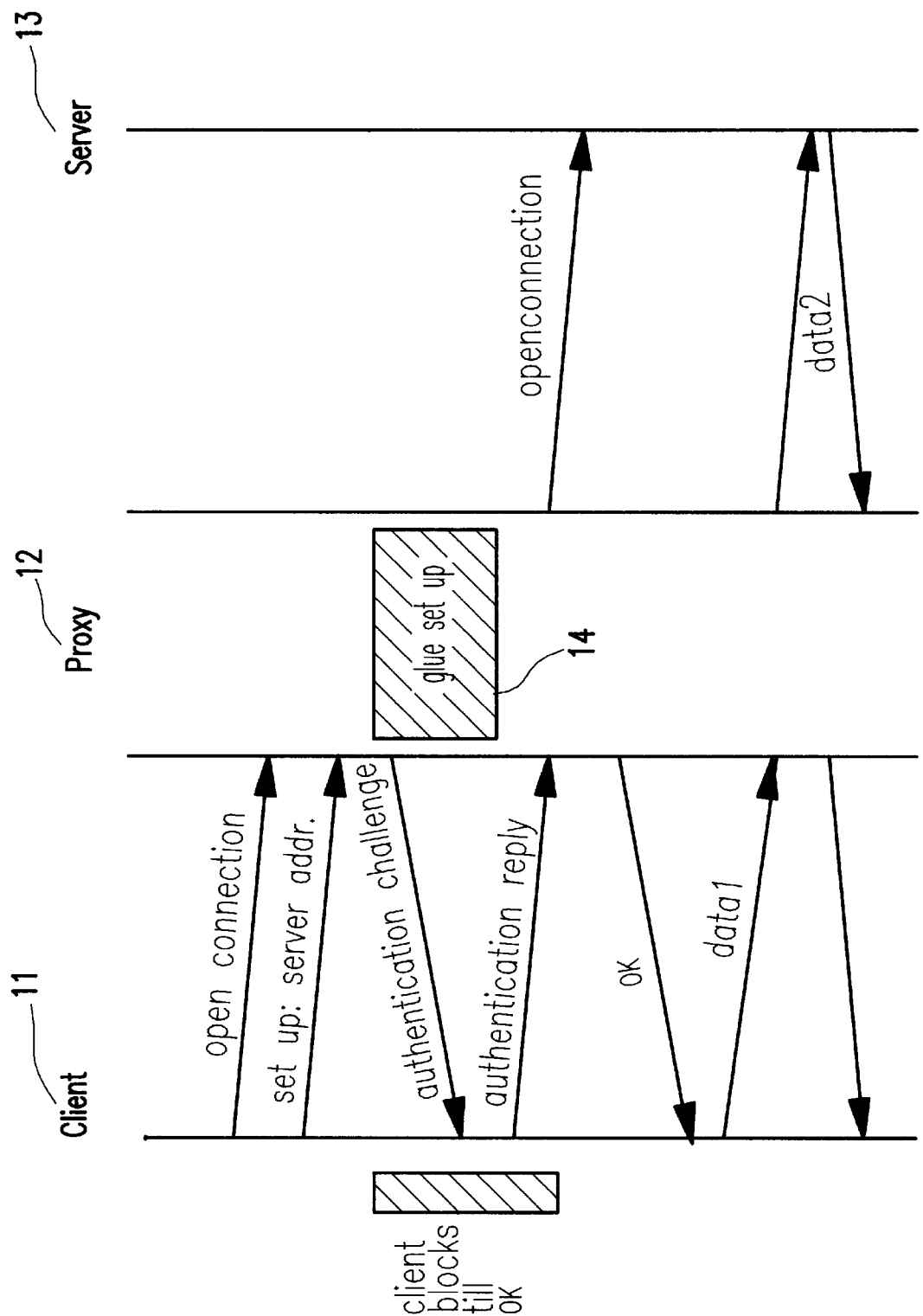
FIG. 2 is a state diagram illustrating message exchange between a telnet client, proxy firewall and telnet server showing use of client surge synchronization by client library.

TCP glue allows the proxy designer to send a fixed size "OK" message to the client such that when the OK message is received, the TCP glue will be set up. Any data read from the client's socket after the OK message will have come from the server, not the proxy. As shown in FIG. 2, the client's designer can use the OK message for synchronization by opening a connection to the server, exchanging session set up data with the proxy, and then blocking until the OK message arrives.

In the message exchange illustrated in FIG. 2 between a Telnet client 11, a proxy firewall 12 and a Telnet server 13, the Telnet client 11 opens the connection and sets up the connection by transmitting the server address to the firewall proxy 12. In response to an authentication challenge from the firewall proxy 12, the Telnet client 11 provides an authentication reply. The TCP glue 14 is then set up by the firewall proxy 12, and while this occurs, the Telnet client 11 blocks further communication. When the TCP glue is set up, a connection is opened with the Telnet server 13 and an OK message is sent to the Telnet client 11. Upon receipt of the OK message, communication is unblocked and datal from the Telnet client 11 is transmitted to the Telnet server 13 via the firewall proxy 12 and data2 from the Telnet server 13 is transmitted to the Telnet client via the firewall proxy 12.

Server Surge

Figure 3:
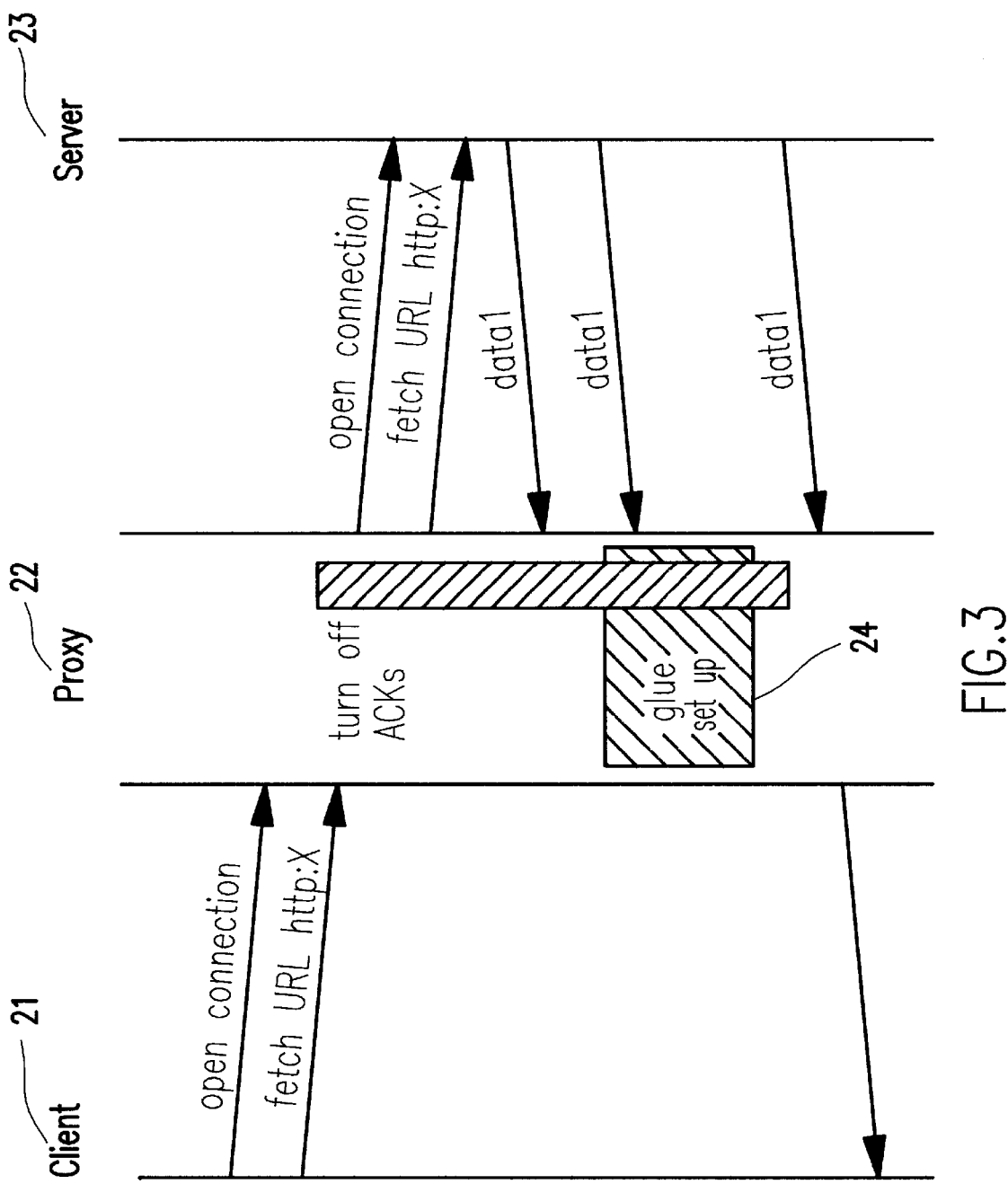
FIG. 3 is a state diagram illustrating message exchange between a web browser, caching proxy, and web server showing use of server surge synchronization.

TCP glue allows the proxy designer to stop a socket from sending TCP acknowledgments (ACKs). The result is that even though the surge data sent by the server has arrived and may be read by the proxy, the server will not believe it has arrived and retransmit it until such time as ACKs are re-enabled or the TCP glue completes and the client is able to receive and ACK the data. FIG. 3 shows such a synchronization scheme in use for an HTTP caching proxy.

The message exchange illustrated in FIG. 3 is between a web browser (the client) 21, a caching proxy 22, and a web server 23. The web browser 21 opens a connection and sends a URL addressed as "http:X" to the HTTP caching proxy 22. The caching proxy 22 turns the ACKs off, opens the connection with the web server 23, and fetches the URL "http:X". datal is retrieved from the web server 23 by the caching proxy 22 which then sets up the TCP glue 24. Once the TCP glue has been set up, the ACKs are turned back on and data flows from the caching proxy 22 to the web browser 21.

Designing a Web-Proxy using TCP Glue

In the preferred embodiment of the invention, a SOCKS firewall server is used as an example to illustrate the technique of TCP gluing. The SOCKS example is but one example of an application of the invention to network communications. In general, the technique of TCP gluing can be applied to improve performance of any transport layer proxy, including the HTTP caching proxy.

An HTTP caching proxy also employs similar techniques. However, there are three main differences worth mentioning:

(1) It is important to point out that authentication exchange shown in FIG. 2 is only a required step in the SOCKS protocol. It is not a requirement for setting up the TCP glue. In fact, an HTTP caching proxy may choose to omit the authentication step.

(2) TCP glue can be established even after an arbitrary amount of data have been exchanged over each connection. In the SOCKS example, the TCP glue is established immediately after the authentication step but, in general, there is no such restriction.

(3) Unlike a SOCKS proxy, an HTTP proxy may also choose to keep a copy of the data stream that is relayed over a glued connection. The stored data stream may be used by another application running on the proxy to fill a data cache that is used to serve future requests from other clients for the same information. However, retaining a copy of the data stream is not a requirement. In general, an HTTP proxy may choose to keep or discard a copy of the data stream based on any of the following (but not limited to) factors:

C Packet inter-arrival time—The purpose of HTTP caching is to improve throughput and reduce latency for web access. If packet inter-arrival time is short, packets are already arriving from the server at a reasonably fast rate. A proxy, therefore, may choose not to cache the arriving data stream.

C Past history of requests for the information—A decision to tap a connection may also depend on past history of requests for that information; e.g., an HTTP proxy may decide to cache a data stream whenever it finds out that thers have been more than a certain threshold number of accesses to taht data item in the past.

C Available resources on the proxy—Central processor unit (CPU), disk space and memory are three major resources needed for caching data streams. If any of them is in short supply, caching decisions may be affected.

C Current contents of the proxy cache—A caching policy may also take current contents of the proxy cache into consideration in making caching decisions.

C Characteristics of the data content—An HTTP proxy may also choose to cache a data stream based on its contents. For example, an HTTP proxy may cache only those web pages whose headers contain a certain keyword.

Mapping Sequence Numbers

Since both connections (client-proxy and proxy-server) have their own sequence spaces, as segments arrive on one connection (say, the proxy-server connection) all the sequence space related information must be mapped to the sequence space of the other connection (the client-proxy connection) before forwarding or the segment will not be intelligible to the other end-system (the client).

Figure 4:
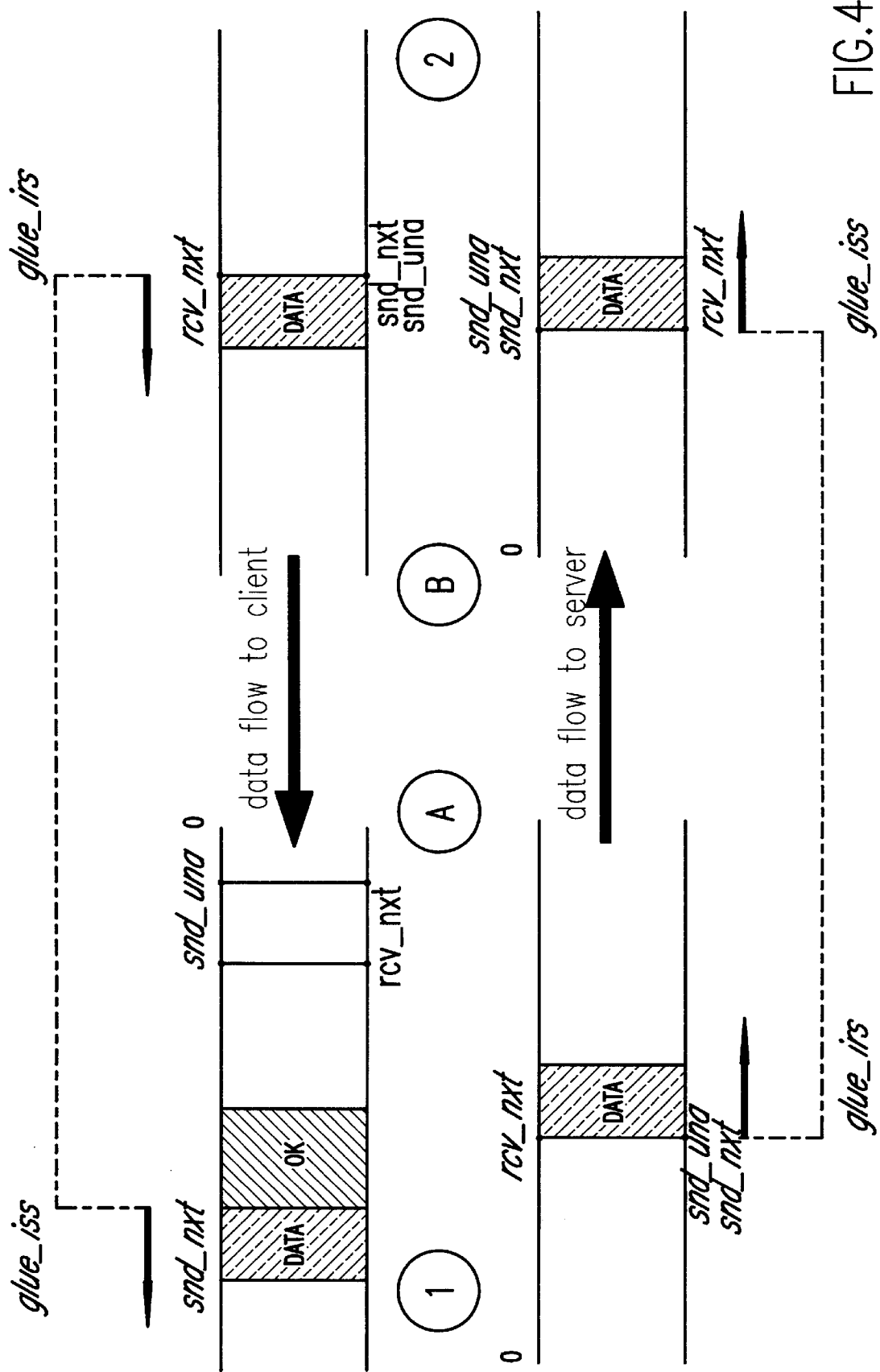
FIG. 4 is a data flow diagram showing two connections glued together by a proxy.

Given proper use of the synchronization primitives, there will be no data in flight, and, with the exception of the OK message being sent to the client, all data flows will be quiet. FIG. 4 shows the two connections at the time they are glued. The two connections, socket $\hat{I}$ to socket $\pm A$ and socket $\pm B$ to socket $\ddot{I}$) are glued together by the proxy. Counters labeled above the sequence spaces in slanted font are kept by sockets $\pm A$ and $\pm B$ at the proxy. Counters labeled in the serif bold below the sequence spaces are kept by sockets at the end systems, sockets $\hat{I}$ and $\ddot{I}$. The thick arrows show how the next byte of data received on one connection will be mapped to the next byte of data sent on the other connection.

The mapping from server to client sequence space is chosen so that the next data byte arriving at socket $\pm B$ from socket $\ddot{I}$ is assigned a sequence number that is the same as the next sequence number on socket $\hat{I}$ the client expects to receive from socket $\pm A$ on the proxy. The server to client sequence space mapping is chosen in a corresponding fashion. This mapping is described by two numbers for each of the two glued sockets. The numbers act as base points for a new virtual sequence space and are called the glue initial receive sequence number (glue_irs) and the glue initial send sequence number (glue_iss). The TCP glue base points for socket $\pm A$ are set as glue_irs equals rcv_nxt and glue_iss equals snd_nxt (leaving room in the sequence space for the OK message). For socket ±B, glue_irs equals rcv_nxt and glue_iss equals snd_nxt.

Figure 5:
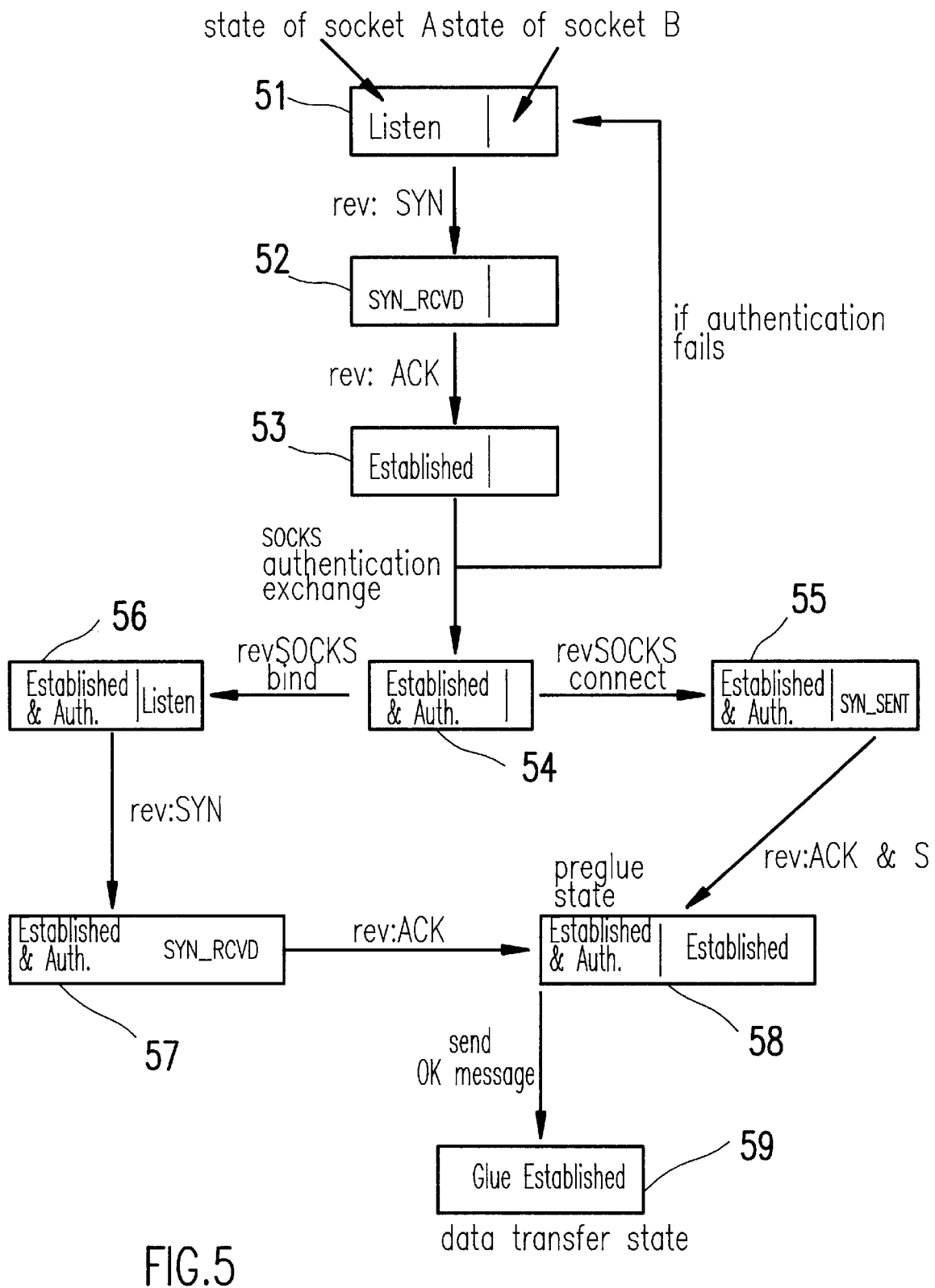
FIG. 5 is a state diagram illustrating the process of TCP glue establishment.

During the connection establishment and tear down phase, the end points of two TCP connections terminating at the proxy undergo various state transitions. FIG. 5 is a state diagram which shows the glue establishment process as described above. Since there are two TCP connections involved in the process, each box in the state diagram shows the state of each connection separated by a vertical bar; i.e., the state of socket A is shown to the left of the bar and the state of socket B is shown to the right of the bar.

At the proxy, socket A stays in the LISTEN state 51 until it receives an "OPEN CONNECTION" message (called SYN packet in TCP terminology) from the client or local host. The proxy replies with a SYN & ACK message and moves to the SYN_RCVD state 52. When the acknowledgment for SYN & ACK arrives from the client, the connection between the client and the proxy is established at state 53. Over the newly established connection, using SOCKS version 4 or 5 protocol, the client and the proxy exchange authentication information. If the client fails the authentication test, socket A returns to LISTEN state 51, resetting the connection between the client and the proxy. Upon the successful completion of the authentication process, the connection moves to ESTABLISHED AND AUTH state 54.

The proxy waits until it receives SOCKS connect or SOCKS bind message from the client. Using SOCKS connect message, the client directs the proxy to open a TCP connection to the address specified in the connect message in state 55. Similarly, using SOCKS bind message, the client requests the proxy to start accepting connections from a remote server in state 56. In both cases, the proxy opens a new socket, B, and, using TCP's standard three-way handshake protocol, establishes a new connection between the proxy and the remote server. Thus, in the case of a SOCKS connect message, the state of socket A remains in the ESTABLISHED state and the proxy sends the SYN packet to the remote host at socket B, as indicated by state 55. In the case of a SOCKS bind message, socket A remains in the ESTABLISHED state and socket B at the proxy is in the LISTEN state, as indicated by state 56. When the SYN packet is received at socket B, the state of socket B goes to SYN_RCVD, as indicated at state 57.

Up to this point, sockets A and B have separate existence; i.e., they are not glued together. Data received over either connection would be received in socket buffers of the proxy and be subsequently processed by the application server running on the proxy. The two sockets, although both in the ESTABLISHED state at state 56, are in a preglue state. Transmission of the synchronization message, "OK", marks the transition from the preglue state to glued state. In the glued state 59, data received over the glued connection is no longer buffered in socket buffers at the proxy. Instead, the data is relayed directly to the other end after making suitable header modifications.

Modifying Packet Headers

As each segment is received at a glued socket, the segment's headers are altered to address the segment to the socket at the other end of the glued connection. The segment's TCP headers are altered so the segment will be intelligible to the end system when it arrives; that is, the segment will look like a continuation of the normal TCP connection the end system first started with the proxy. Processing a segment requires three steps; changing the IP and TCP headers and making special sanity checks.

Alter IP Header
C Change source and destination address to that of outgoing connection.
C Remove IP options from incoming packet.
C Update IP header checksum.
Alter TCP Header
C Change source and destination port numbers to match outgoing connection.
C Map sequence number from incoming sequence space to outgoing space. seq_num=(seq_num−in6glue_irs)+out6glue_iss
C Map ACK number from incoming sequence space to outgoing space. ack_num=(ack_num−in6glue_iss)+out6glue_irs
C Update TCP header checksum.
Perform Sanity Checks The OK message marks the boundary between the client communicating with the proxy and the client communicating with the server. Any reference the client makes to sequence numbers before the mapping points (Ⓐ glue_iss in FIG. 4) must be processed by the proxy's normal TCP state machine since the client could be requesting retransmissions of the OK message or other complicated functionality.

Although it should never happen for simple TCP glue, it is possible in the general case for the server to retransmit data that when mapped into the client-proxy sequence space would overlap the sequence numbers consumed by the OK message. This cannot be allowed to happen since it could result in the OK message being garbled. To prevent overlap, the proxy must chop the beginning off any segments that overlap the mapping point Ⓐ glue_iss at the mapping point.
C Interpret client ACKs of sequence numbers before mapping point locally as retransmission requests for OK message.
C Protect OK message from spurious retransmissions from server by chopping server segments at mapping point.
TCP options are left in place, so end systems can use the full functionality of the TCP transport layer.

Figure 6:
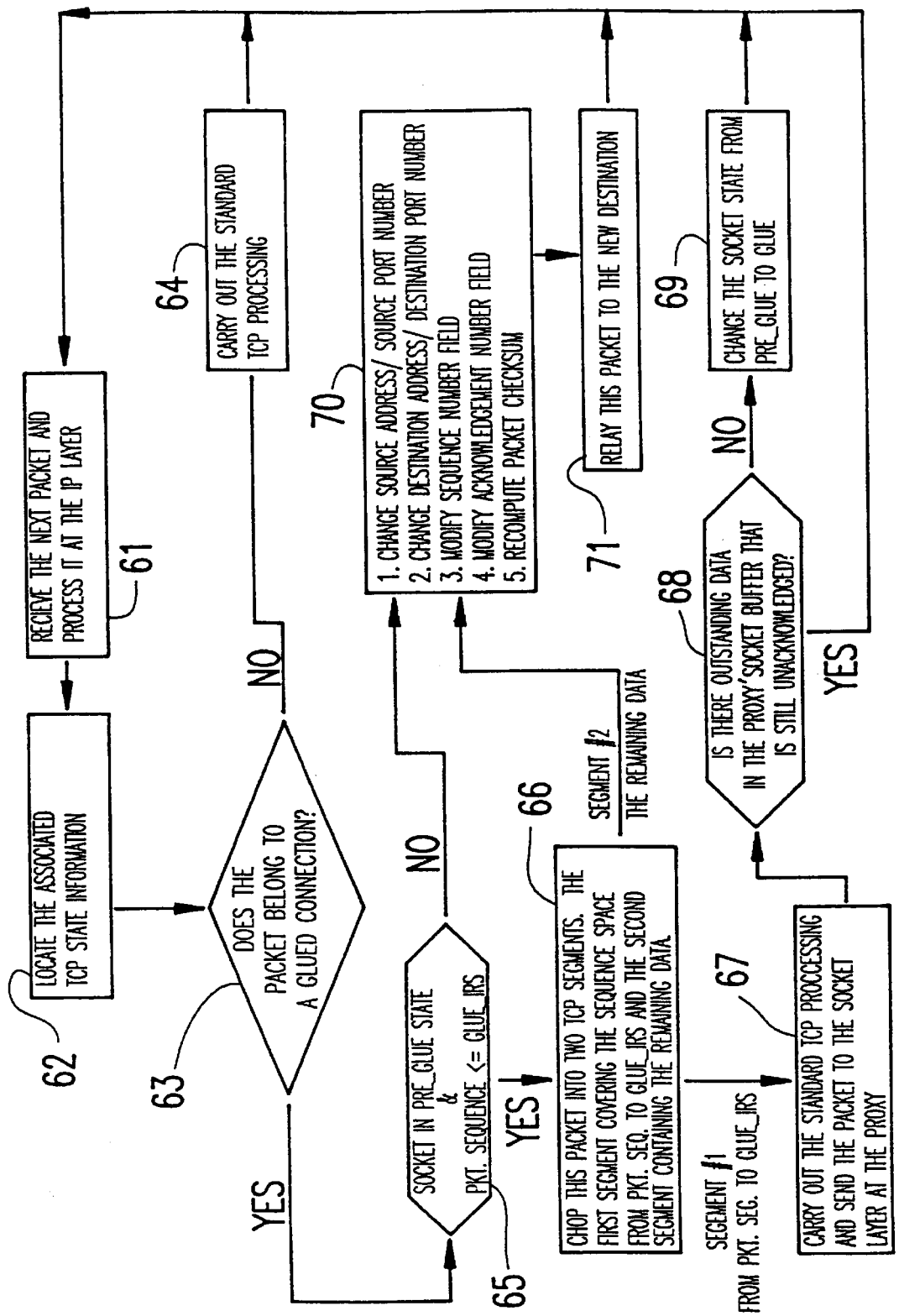
FIG. 6 is a flow diagram illustrating the TCP glue processing logic.

The process is illustrated in more detail by the flow diagram of FIG. 6. Packets are received at function block 61 and processed at the IP layer. The associated TCP state information is then located in function block 62. Before the OK message is sent, both sockets A and B are marked in PRE_GLUE state, as shown in FIG. 5. The OK message marks the boundary between the client or local host communicating with the proxy and the client communicating with the server or remote host. Thus, in decision block 63, a determination is made as to whether the received packet belongs to a glued connection. Any reference the client makes to sequence numbers before the mapping point (Ⓐ glue_iss in FIG. 4) must be processed by the proxy's normal TCP state machine at function block 64 since the client could be requesting retransmissions of the OK message or other complicated functionality.

If the packet is determined in decision block 63 to belong to a glued connection, a further test is made in decision block 65 to determine if the socket is in the PRE_GLUE state. Although it should never happen for simple TCP glue, it is possible in the general case for the server to retransmit data that, when mapped into the client-proxy sequence space, would overlap the sequence numbers consumed by the OK message. This can not be allowed to happen since it could result in the OK message being garbled. To prevent overlap, the proxy must chop the beginning off any segments that overlap the mapping point Ⓐ glue_iss at the mapping point, as indicated in function block 66. Segment #1 is applied to function block 67 where the standard TCP processing is performed and the packet is sent to the socket layer at the proxy.

The following checks are made:
C Interpret client ACKs of sequence numbers before mapping point locally as retransmission requests for the OK message.
C Protect the OK message from spurious retransmissions from the server by chopping the server segments at the mapping point.

These checks, however, are only needed as long as there are unacknowledged data in the proxy's socket buffers as determined in decision block 68. After data in the A and B socket buffers are acknowledged, the proxy can safely omit these checks. FIG. 6 shows that these checks are only performed when sockets are in PRE_GLUE state. When the proxy has determined that sanity checks are no longer necessary, it changes the state of the glued socket from PRE_GLUE to GLUE in function block 69. At this point, a return is made to function block 61 where the next packet is received for processing.

If the received packet belongs to a glued connection, as determined in decision block 63, and the socket is not in the PRE_GLUE state (that is, the socket is in the GLUE state), as determined in decision block 65, the process goes to function block 70 where:
C the source address and source port number are changed,
C the destination address and destination port number are changed,
C the sequence number field is modified,
C the acknowledgment number field is modified, and
C the packet checksum is recomputed.

Except for the TCP selective acknowledgment option, remaining TCP options are left in place, so end systems can use the full functionality of the TCP transport layer. Since the TCP selective acknowledgment option makes use of sequence numbers, it is necessary to map sequence numbers from incoming sequence space to outgoing sequence space. TCP urgent pointers are represented as offsets from the segment's sequence number. They are not changed during the mapping procedure.

The current embodiment recomputes both TCP and IP checksums from scratch to ease implementation, but techniques in common practice would allow the checksums to be updated in a fail-safe manner. Performing fail-safe checksum updates removes the need for the proxy to verify the checksum and reduces the cost of updating the checksum to reflect the changes made to the packet, thereby further increasing performance.

When the processing of function block 70 is completed, the modified packet is relayed to the new destination in function block 71. A return is then made to function block 61 to receive the next packet for processing.

Connection Tear Down

As TCP segments are passed from through the glue, they are examined for indications that the end systems are closing their connection. When the end systems finalize their connection, the TCP glue code tears down the glue between the two sockets and frees them.

The two basic rules for tearing down the TCP glue are:
C Normal Close: If each side sends a finish message (FIN) and sends an ACK message to the other side's FIN message, then tear down the glue because the end systems have closed.
C Abortive Close: If either side sends a reset message (RST), tear down the glue.

In both cases, following the close operation, the connection state information associated with the glued connection is maintained for a timeout period. This ensures that any delayed segment received over the glued connection is correctly relayed to the other end. After the timeout period, it is no longer necessary to maintain the glue state since any wayward segments will have been be cleaned out of the network by the end of the timeout period.

The TCP glue code could also be modified to tear down the glue connections upon command from the proxy process in user space, or to report back to the proxy process statistics for logging purposes such as the number of bytes sent on the glued connection.

Figure 7:
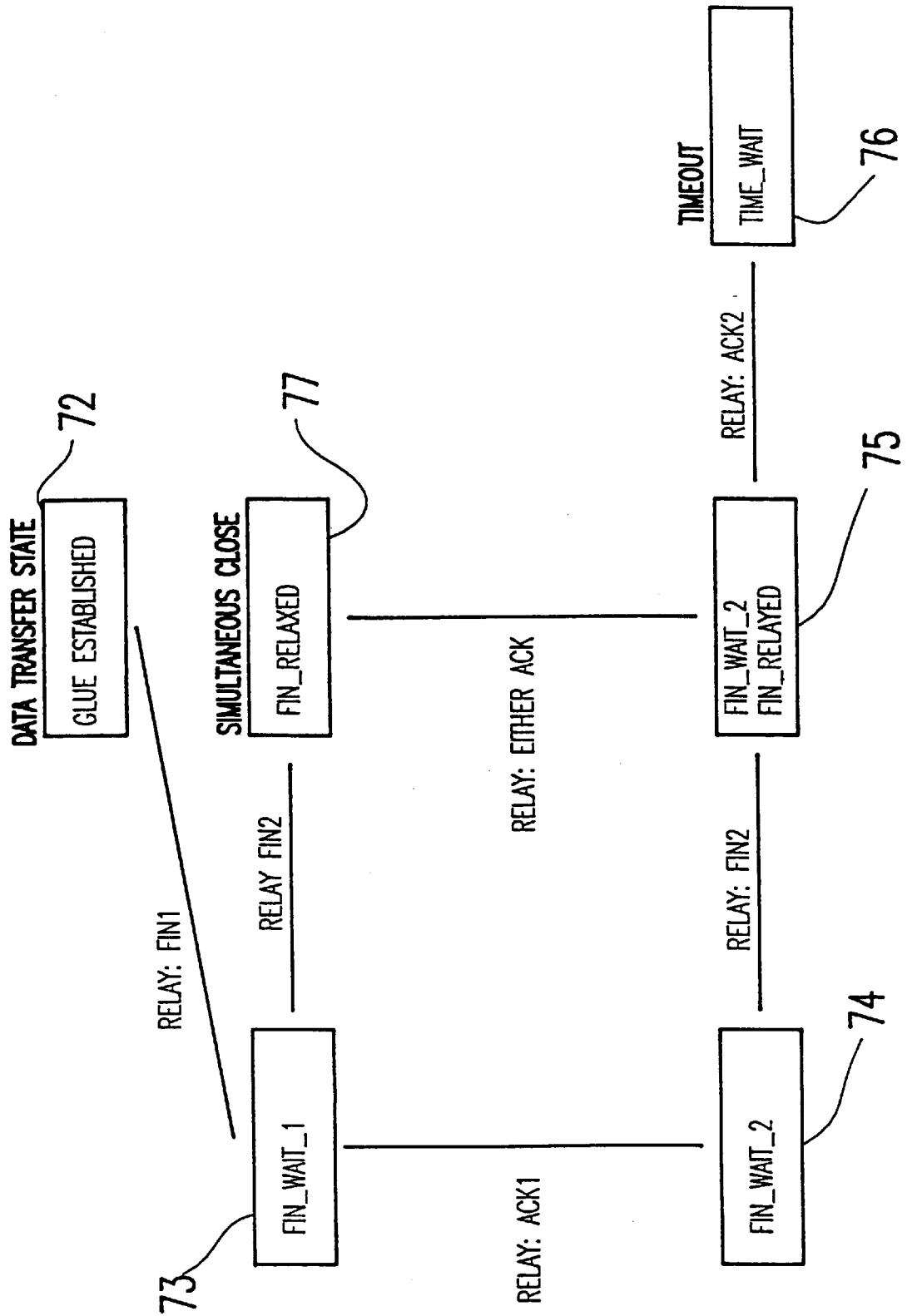
FIG. 7 is a state diagram illustrating the process of TCP glue tear down.

The TCP glue tear down process for the normal close is shown in the state diagram of FIG. 7. Picking up from the state diagram of FIG. 5, the proxy is in the data transfer state 72; that is, the glue is established. When a FIN message from, say, the local host of the first connection (FIN1) is received by the proxy, that message is related to the remote host of the second connection, and the proxy enters a wait state (FIN_WAIT_1) 73. When an acknowledgment message (ACK1) is received from the remote host, the proxy relays this message to the local host and enters a second wait state (FIN_WAIT_2) 74. The remote host transmits a finish message (FIN2) to the proxy, which the proxy relays to the local host. The proxy continues in a wait state 75. The connection state information associated with the glued connection is maintained until the local host transmits an acknowledgment message (ACK2) or for a timeout period 76, whichever comes first. If the ACK2 message is received before the timeout period, the message is relayed by the proxy to the remote host, and the connection is torn down. The timeout period ensures that any delayed segment received over the glued connection is correctly relayed to the other end. After the timeout period, it is no longer necessary to maintain the glue state since any wayward segments will be cleaned out of the network by the end of the timeout period.

A simultaneous close is also possible. In this case, finish messages are transmitted by both the local host and the remote host. The proxy relays the finish messages (FIN1 and FIN2) to the respective remote and local hosts and enters a wait state 77. Then upon receiving either acknowledgment (ACK1 or ACK2), the proxy enters state 75 to begin the timeout period.

Summary

The method according to the invention glues two TCP connections such that segments received on one connection are forwarded to the other connection, and vice versa, without incurring any transport or the application layer processing overhead. This technique can be effectively used to improve the performance of proxy servers, such as SOCKSs firewall gateways and HTTP caching proxies. The technique of TCP gluing is superior to the method of application layer gateways in that it is more efficient, requires less state maintenance, provides better end to end semantics, reliability, etc., and provides better out-of-band data transfer semantics.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of gluing a first and a second connection in a packet communication network into a single end-to-end connection wherein the first and second connections both terminate at a common host and wherein the first and second connections terminate at a first end point and a second end point, respectively, the method comprising the steps of:

modifying, at the common host, headers of first packets received from the first end point of the first connection to correspond to headers of packets of the second connection and transmitting the first packets to the second end point of the second connection; and modifying, at the common host, headers of second packets received from the second end point of the second connection to correspond to headers of packets of the first connection and transmitting the second packets to the first end point of the first connection, the headers being modified on-the-fly as packets are received at the common host.

2. The method recited in claim 1 wherein the first end point is a local host attached to a network that is protected by a firewall and the second end point is a remote host connected to a network outside the firewall but reachable by the firewall, and wherein a proxy having an access right to send and receive data across the firewall runs on the common host and acts as a mediator between the local host and the remote host and wherein the connection is a Transmission Control Protocol (TCP) connection and the packets have TCP/Internet Protocol (IP) headers.

3. The method recited in claim 2 wherein the step of header modification for packets received at the proxy over the first connection comprises the steps of:

(a) changing a destination IP address to that of a remote host IP address;

(b) changing a source IP address to that of an IP address of the proxy's interface that is used to send packets to the remote host;

(c) changing a TCP port number;

(d) changing a send sequence number field;

(e) changing an acknowledgment (ACK) sequence number field; and (f) recomputing or updating a checksum;

and wherein the step of header modification for packets received at the proxy over the second connection further comprises the steps of:

(g) changing a destination IP address to that of a local host IP address;

(h) changing a source IP address to that of an IP address of the proxy's interface that is used to send packets to the local host;

(i) changing a TCP port number;

(j) changing a send sequence number field;

(k) changing an ACK sequence field; and (l) recomputing or updating a checksum.

4. The method recited in claim 3 wherein there are two independent TCP connections, a first connection between the local host and the proxy and a second connection between the proxy and the remote host, and the proxy relays packets between the two TCP connections comprising the steps of:

(a) modifying TCP/IP headers of packets of the first connection such that, after modification, the packets appear to belong to the second connection, where the header information is modified on-th-fly as the packets are received at the proxy;

(b) transmitting the packets with the modified header information to the remote host; and (c) repeating steps (a) and (b) on every packet which is received from the remote host and is relayed to the local host by the proxy.

5. The method recited in claim 3 further comprising the step of choosing a sequence number mapping at the proxy so that, after the first and second connections are glued together, a next data byte sent from the common host over the second connection is assigned a sequence number that is the same as a next sequence number the local host expects to receive over the first connection and a next data byte sent to the remote host over the first connection is assigned a sequence number that is the same as a next sequence number the remote host expects to receiver over the second connection.

6. The method recited in claim 5 wherein the proxy and remote host may each exchange arbitrary data over the proxy and remote host TCP connection and the proxy and local host may each exchange arbitrary data over the proxy and local host TCP connection until, at some point, the proxy glues together the two TCP connections after which point packets sent to the proxy by the local host are altered and forwarded to the remote host and packets sent to the proxy by the remote host are altered and forwarded to the local host.

7. The method recited in claim 1 wherein the first end point is a local host attached to a network that is protected by a firewall and the second end point is a remote host connected to a network outside the firewall but reachable by the firewall, and wherein a proxy having an access right to send and receive data across the firewall runs on the common host and acts as a mediator between the local host and the remote host, the method further comprising the steps of:

(a) rejecting by the proxy all attempted connections from hosts other than approved local hosts and terminating by the proxy all connections that fail authentication and/or authentication checks;

(b) making data connections by a local host to the proxy, the local host specifying an address of a remote host with which the local hosts wish to communicate;

(c) modifying by the proxy headers of all packets received from the local host so that the packets appear to originate from the proxy and forwarding by the proxy the packets to the remote host;

(d) modifying by the proxy headers of all packets sent by the remote host as part of the connection begun by the local host so that the packets appear to originate from the proxy and forwarding the packets to the local host;

(e) repeating steps (c) and (d) for any packets received from the local and remote hosts by the proxy as part of the connection; and (f) treating by the proxy any packet arriving at the proxy that is not part of the connection that has passed authorization and/or authentication checks as an attempted security violation.

8. The method recited in claim 7 further comprising the step of synchronizing the local host and the remote host with the glue action by the proxy running on the common host.

9. The method recited in claim 8 wherein the step of synchronizing the local host, proxy and remote host is achieved by the sending and receiving of pre-existing messages of an authentication and authorization protocol with any modifications.

10. The method recited in claim 7 further comprising the step of ensuring that if data are in transit through the network between the local host and the proxy or between the proxy and the remote host when the proxy performs the glue operation, the data are correctly delivered to their destinations and are retransmitted as needed.

11. The method recited in claim 7 further comprising the steps of:
optionally storing at the proxy a copy of the data from each of the packets relayed by the proxy; and
making the stored copy of the data available to other processes on a machine on which the proxy is running.

12. The method recited in claim 11 wherein the stored copy of the data is stored in a data cache that is used to serve future requests from other local hosts for the data.

13. The method recited in claim 12 wherein the proxy is a Hypertext Transfer Protocol (HTTP) caching proxy.

14. The method recited in claim 11 wherein the stored data is copied into a buffer at the proxy from which another process can read the stored data.

15. The method recited in claim 11 further comprising the step of deciding to store a copy of the data, the step of deciding being based on any one of the packet interarrival time, past history of requests for that information, available resources on the proxy, current contents of the proxy cache, rate at which proxy can store or retrieve cache data, and characteristics of the data content.

16. The method recited in claim 7 further comprising the steps of:
tearing down completed connections, wherein a third spliced connection is torn down and resources consumed by the third connection in the proxy are released when each endpoint of the two connections sends a finish (FIN) message and the other endpoint sends and acknowledgment (ACK) message of the FIN message or a reset (RST) is sent by either endpoint.

17. In a packet communication network using Transmission Control Protocol (TCP), a method for managing a connection between first and second end systems and a session layer proxy comprising the steps of:
enabling synchronization between the first and second end systems and the session layer proxy;
mapping TCP sequence space of the first or second end system to the second or first end system, respectively, at the session layer proxy;
as each TCP segment is received at the session layer proxy from the first or second end system, modifying header information of the segment to address the segment to the second or first end system, respectively; and
tearing down completed connections between the first and second end systems when the connection between the first and second end systems is closed.

18. The method recited in claim 17 wherein the step of tearing down is performed whenever the first or second end system transmits a finish (FIN) message and the second or first end system transmits an acknowledgment (ACK) message in response to the FIN message.

19. The method recited in claim 18 wherein the step of tearing down is additionally performed whenever either of the first or second end systems transmits a reset (RST) message.

20. The method recited in claim 17 wherein the first end system is a local host connected to a local network and the second end system is a remote host connected to a remote network and the session layer proxy runs on a network firewall to which the local network is connected, the network firewall only allowing traffic originated from and destined to a set of authenticated hosts to flow across the network firewall and the session layer proxy having an access right to send and receive data across the network firewall.

21. The method recited in claim 20 wherein the remote network is the Internet and the packets have TCP/IP (Internet Protocol) headers, the method further comprising the step of modifying TCP/IP headers of packets received from the remote host and the local host to correspond to TCP/IP headers of the local host and the remote host, respectively, and wherein the headers are modified on-the-fly as packets are received by the session layer proxy.

22. The method recited in claim 17 wherein the first end system is a local host connected to a local network and the second end system is a remote host connected to a remote network and the session layer proxy is a caching proxy including a data cache into which data streams from the local host and the remote host are stored.

23. The method recited in claim 22 wherein the remote network is the Internet and the packets have TCP/IP (Internet Protocol) headers, the method further comprising the step of modifying TCP/IP headers of packets received from the remote host and the local host to correspond to TCP/IP headers of the local host and the remote host, respectively, and wherein the headers are modified on-the-fly as packets are received by the session layer proxy.

24. In a packet communications network, a method of splicing a first and second connection into a single end-to-end connection at a session layer proxy, where said first and second connections terminate at first and second hosts respectively, the method comprising the steps of:
enabling synchronization between the first and second hosts and the session layer proxy; and
modifying headers of packets of the first connection and the second connection to correspond to headers of packets of the second and the first connection, respectively, wherein the header information is modified on-the-fly as packets are received at said session layer proxy.

25. A packet communications network comprising:
a local host attached to a local network;
a network firewall connected to said local host and protecting said local network;
a remote host connected to a network outside the network firewall but reachable by the network firewall;
a session layer proxy running on the network firewall and having the access right to send and receive data across the network firewall, said session layer proxy acting as a mediator between said local host and said remote host, said session layer proxy enabling synchronization between the local host and the remote host and the session layer proxy and operative to modify headers of packets of a first connection between the local host and the network firewall to correspond to headers of packets of a second connection between the remote host and the network firewall, where said header information is modified on-the-fly as said packets are received at said session layer proxy.

26. A method implemented on a network firewall in a packet communication system and providing a first connection between a local host and the network firewall and a second connection between a remote host and the network firewall, and wherein a proxy has an access right to send and receive data across the network firewall and acts as mediator between the local host and the remote host, the method comprising the steps of:
(a) the proxy rejecting all attempted connections from hosts other than approved local hosts and terminates all connections that fail authentication and/or authorization checks;

(b) approved local hosts making data connections to the proxy and specifying the address of the remote host they wish to communicate with;

(c) the proxy modifying headers of all packets received from the local host so they appear to originate from the proxy and forwarding them to the remote host;

(d) the proxy modifying the headers of all packets sent to the remote host as part of the data connection begun by the local host so that the packets appear to originate from the proxy and forwarding them to the local host;

(e) repeating steps (c) and (d), respectively, for any packet from the local host to the remote host that is part of the data connection begun by the local host; and (f) treating any packet arriving at the proxy that is not part of a data connection that has passed authorization and/or authentication checks as an attempted security violation.

27. The method recited in claim 26, wherein the first and second connections are Transmission Control Protocol (TCP) connections and the packet headers are TCP/IP (Internet Protocol) packet headers.

28. The method recited in claim 27, wherein the steps of modifying headers by the proxy comprises, for packets received at said proxy over said first connection, the steps of:

(a) changing destination IP address to that of remote host IP address;

(b) changing source IP address to that of an IP address of the proxy's interface that is used to send packets to said remote host;

(c) changing a TCP port number;

(d) changing a send sequence number field;

(e) changing an acknowledgement (ACK) sequence number field; and (f) recomputing or updating a checksum; and, for packets received at said proxy over said second connection, comprises the steps of:

(g) changing a destination IP address to that of a local host IP address;

(h) changing a source IP address to that of the IP address of said proxy's interface that is used to send packets to the local host;

(i) changing the TCP port number;

(j) changing the send sequence number field;

(k) changing the ACK sequence number field; and (l) recomputing or updating the checksum.

29. The method recited in claim 28, further comprising the step of mapping TCP sequence space of the first or second end system to the second or first end system, respectively, at the session layer proxy.

30. The method recited in claim 27 wherein there are two independent TCP connections, the first connection between the local host and the proxy and the second connection between said proxy and said remote host, and the proxy relays packets between the two TCP connections comprising the steps of:

(a) modifying TCP/IP headers of packets of the first connection such that, after modification, said packets appear to belong to the second connection, wherein the header information is modified on-the-fly as said packets are received at the proxy;

(b) transmitting said packets with said modified header information to said remote host; and (c) repeating steps (a) and (b) on every packet which is received from said remote host any is relayed to said local host.

31. In a packet communications network using Transmission Control Protocol (TCP), a method of glueing together a TCP connection between a remote host and a proxy and a TCP connection between a local host and the proxy comprising the steps of:

exchanging arbitrary data between the proxy and remote host over the proxy/remote host TCP connection;

exchanging arbitrary data between the proxy and local host over the proxy/local host TCP connection; and glueing together the two TCP connections by the proxy after which point packets sent to the proxy by the local host are altered and forwarded to the remote host by the proxy and packets sent to the proxy by the remote host are altered and forwarded to the local host by the proxy.

32. The method recited in claim 31 wherein the step of glueing includes the step of synchronizing the local host and the remote host by the proxy and wherein the altering of the packets received by the proxy comprises the step of modifying TCP headers of packets of the proxy/remote host TCP connection the proxy/local host TCP connection on-the-fly.

33. The method recited in claim 32 further comprising the step of ensuring that if data are in transit through a network between the local host and proxy or the proxy and remote host when the proxy performs the glueing step, the data are correctly delivered to their destinations and are retransmitted as needed.

34. The method recited in claim 32 wherein the step of synchronizing is achieved by the sending and receiving of the pre-existing messages of an authentication and authorization protocol.

35. The method recited in claim 32 further comprising the optional step of the proxy keeping a copy of the data stream from each of the packets the proxy relays and makes the copy of the data stream available to other processes.

36. The method recited in claim 35 wherein a copied data stream may be used by the proxy to fill a data cache that is used to serve future requests from other local hosts for the same information.

37. The method recited in claim 35 wherein a copied data stream is copied into a buffer at the proxy, from which another host can read the copied data stream.

38. The method recited in claim 35 wherein the optional step of keeping a copy of the data stream is conditional on any of packet interarrival time, past history of requests for that information, available resources on the proxy, current contents of the proxy cache, rate at which proxy can store or retrieve cache data, and characteristics of the data content.

* * * * *